United States Patent [19]

Broecker et al.

[11] Patent Number: 4,507,274

[45] Date of Patent: Mar. 26, 1985

[54] DESULFURIZATION OF H₂S-CONTAINING GASES

[75] Inventors: Franz J. Broecker, Ludwigshafen; Hans Gettert, Gross-Sachsen; Knut Kaempfer, Ludwigshafen, all of Fed. Rep. of Germany

[73] Assignee: BASF Aktiengesellschaft, Fed. Rep. of Germany

[21] Appl. No.: 473,533

[22] Filed: Mar. 9, 1983

[30] Foreign Application Priority Data

Mar. 11, 1982 [DE] Fed. Rep. of Germany ....... 3208695

[51] Int. Cl.³ .................... C01B 17/02; B01J 8/02
[52] U.S. Cl. .................... 423/573 R; 423/573 G; 423/574 R; 423/574 L; 423/576; 422/196; 422/200; 422/201; 422/211
[58] Field of Search .......... 422/171, 196, 211, 200, 422/201, 312; 423/573 R, 573 G, 574 G, 574 R, 574 L, 576

[56] References Cited

U.S. PATENT DOCUMENTS

| | | | |
|---|---|---|---|
| 3,393,050 | 7/1968 | Hunt et al. | 423/576 |
| 3,822,341 | 7/1974 | Smith | 423/574 |
| 4,085,199 | 4/1978 | Singleton et al. | 423/576 |
| 4,196,183 | 4/1980 | Li | 423/573 G |
| 4,197,277 | 4/1980 | Sugier et al. | 423/573 G |

FOREIGN PATENT DOCUMENTS 185780 9/1922 United Kingdom .......... 423/573 G

OTHER PUBLICATIONS

The Condensed Chemical Dictionary, 6th Ed., 1962, pp. 405, 408.
Chemie-Ing.-Techn., 39, 1967, pp. 515 to 520.

*Primary Examiner*—Gregory A. Heller
*Attorney, Agent, or Firm*—Keil & Weinkauf

[57] ABSTRACT

H₂S-containing gases are desulfurized by direct catalytic oxidation of the H₂S to elementary sulfur by means of oxygen-containing gases in a tube reactor, with indirect removal of the heat of reaction by means of a coolant and with condensation of the sulfur formed, wherein either the catalyst is present in the jacket space around the tubes and the coolant is present in the tubes of the reactor or the coolant is present in the jacket space around the tubes and the catalyst is present in the tubes of the reactor, and the catalyst fills the tubes of the tube reactor or the jacket space around the tubes over the entire cross-section of the tubes or the jacket space respectively, the exit temperature of the gaseous reaction mixture leaving the tube reactor is kept at 180°–400° C. and the sulfur formed in the tube reactor is separated out of the reaction mixture, obtained in the reactor, in a condensation stage downstream of the reactor.

9 Claims, 1 Drawing Figure

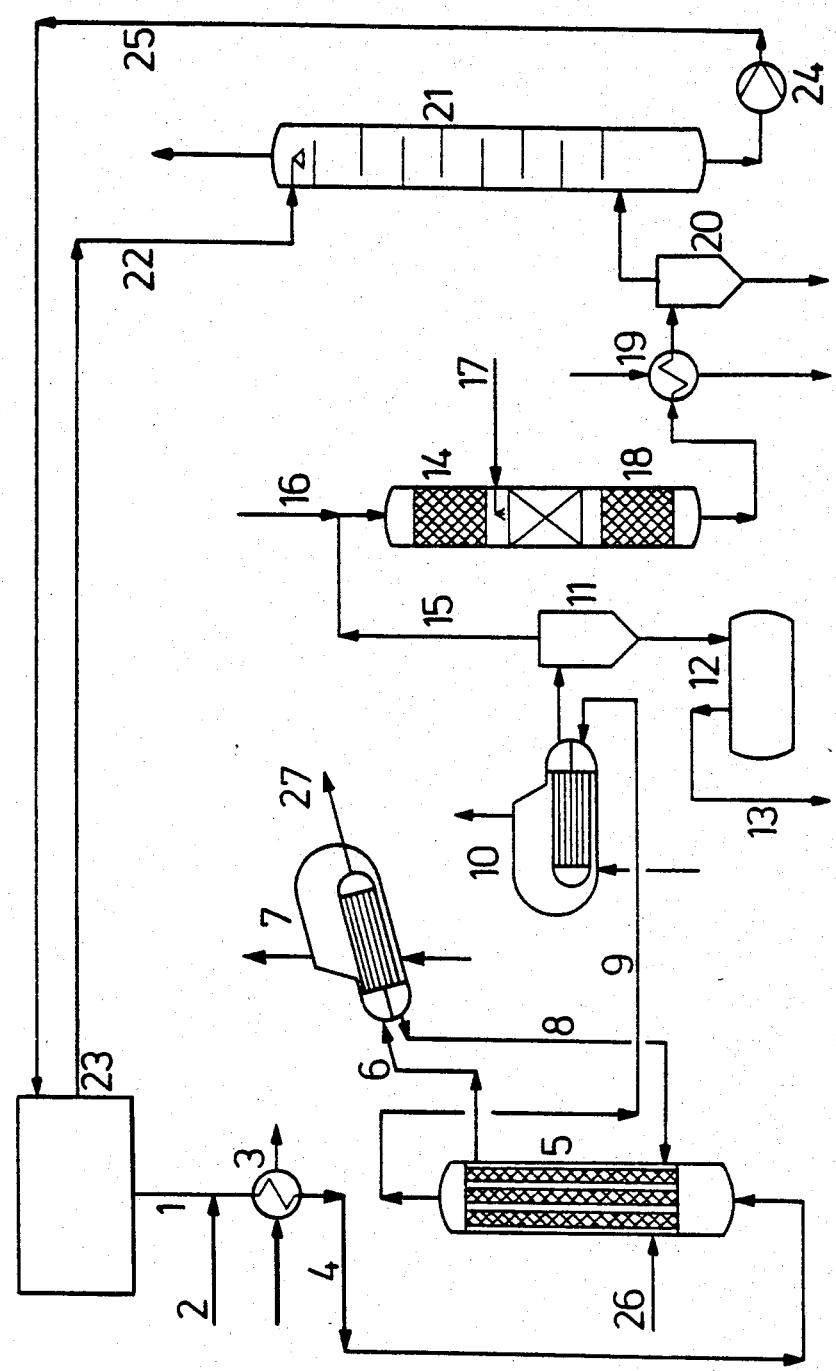

DESULFURIZATION OF H₂S-CONTAINING GASES

The present invention relates to a process for the desulfurization of $H_2S$-containing gases by direct catalytic oxidation of the $H_2S$ to elementary sulfur by means of oxygen-containing gases.

U.S. Pat. No. 3,393,050 has disclosed a process for the direct catalytic oxidation of $H_2S$ to elementary sulfur by reaction with air or $SO_2$ in a tube reactor. In the reactor employed, the tubes contain basket-like inserts in which the catalyst is located. Between the catalyst basket and the tube wall there is an annular gap. To achieve satisfactory conversion in the tube reactor, it is necessary simultaneously to remove from the reactor the heat of reaction and the resulting elementary sulfur in liquid form. To do so, the sulfur formed is condensed on the externally water-cooled tube wall and is collected at the tube reactor exit and discharged. Catalysts used in this process are alumina, aluminum silicate and calcium aluminum silicate. This process requires very expensive apparatus, and a further disadvantage is that because of the specific arrangement of the catalyst used it is not possible to maintain a defined reaction temperature, nor, consequently, a constant conversion.

It is an object of the present invention to provide a process for the desulfurization of $H_2S$-containing gases which can be carried out with less expensive apparatus than the conventional processes.

We have found that this object and other advantages are achieved by a process for the desulfurization of $H_2S$-containing gases by direct catalytic oxidation of the $H_2S$ to elementary sulfur by means of oxygen-containing gases in a tube reactor, with indirect removal of the heat of reaction by means of a coolant and with condensation of the sulfur formed, wherein either the catalyst is present in the jacket space around the tubes and the coolant is present in the tubes of the reactor or the coolant is present in the jacket space around the tubes and the catalyst is present in the tubes of the reactor, and the catalyst fills the tubes of the tube reactor or the jacket space around the tubes over the entire cross-section of the tubes or the jacket space respectively, the exit temperature of the gaseous reaction mixture leaving the tube reactor is kept at 180°–400° C. and the sulfur formed in the tube reactor is separated out of the reaction mixture, obtained in the reactor, in a condensation stage downstream of the reactor.

Using the novel process, the direct catalytic oxidation of hydrogen sulfide to elementary sulfur can be carried out in a simple tube reactor, and gives sulfur yields of more than 90%. Expensive removal of the resulting elementary sulfur in liquid form from the tube reactor is not necessary. The novel process has substantial advantages over the conventional Claus process, in which as a rule the $H_2S$-containing gases must have an $H_2S$ content of not less than 50% by volume if they are to be capable of simple reaction with air (cf. Cnemie-Ing.-Techn., 39 (1967), 515–520). In contrast, using the process according to the invention, gases of low $H_2S$ content can be converted without first having to enrich them to $H_2S$ contents of not less than 50% by volume. It is surprising that using the novel process sulfur yields of more than 90% can be achieved since U.S. Pat. No. 3,393,050 describes that to achieve a high sulfur yield a catalyst-free space must be maintained between the catalyst basket and the tube wall and it is necessary simultaneously to remove from the tube reactor the heat of reaction and the resulting elementary sulfur in liquid form.

The direct catalytic oxidation of the $H_2S$ to elementary sulfur by means of oxygen-containing gases is carried out in a tube reactor with indirect removal of the heat of reaction by means of a coolant, with either the catalyst being present in the jacket space around the tubes and the coolant in the tubes of the reactor or the coolant being present in the jacket space around the tubes and the catalyst in the tubes of the reactor, and the catalyst filling the tubes of the tube reactor or the jacket space around the tubes over the entire cross-section of the tubes or the jacket space respectively. It is particularly advantageous to carry out the direct catalytic oxidation isothermally, i.e. so as to keep the reaction temperature in the tube reactor constant to within a range of not more than $\pm 10°$ C., preferably not more than $\pm 5°$ C., especially not more than $\pm 3°$ C. In general, the catalytic oxidation is carried out under conditions such that the exit temperature of the reaction gas from the tube reactor is from 180° to 400° C., preferably from 200° to 350° C., especially from 220° to 320° C.

In general, the catalytic oxidation is carried out under atmospheric pressure or slightly super-atmospheric pressure, but it can also be carried out under reduced pressure. Pressures from 0.5 to 10 bar, preferably from 0.6 to 5 bar, especially from 0.8 to 2 bar, are generally employed.

Examples of suitable coolants for the catalytic oxidation are water or organic heat transfer oils such as diphenyl or diphenyl ether. The preferred organic heat transfer oil is a mixture of diphenyl and diphenyl ether, advantageously in a weight ratio from 1:20 to 10:1, preferably from 1:10 to 5:1. The use of the azeotropic mixture of 27% of diphenyl and 73% of diphenyl ether is particularly advantageous. If an organic heat transfer oil is used as the coolant, the heat of reaction is advantageously removed by evaporative cooling. It can be advantageous, when desulfurizing gases containing less than about 5% by volume of $H_2S$, to employ water as the coolant, and when desulfurizing gases containing from about 5% by volume of $H_2S$ upwards to use an organic heat transfer oil as the coolant, to remove the heat of reaction.

Examples of suitable catalysts for the direct catalytic oxidation are those which contain one or more metals and/or their compounds, preferably the oxides and/or sulfides, of groups 1b to 7b and 8 of the periodic table of the elements (as defined in the Handbook of Chemistry and Physics, 49th edition, 1968–1969) and of the lanthanides.

Suitable catalysts contain, for example, iron, cobalt, nickel, molybdenum and/or their sulfides or oxides. The catalysts can be used as such or on a carrier. Examples of suitable carriers are aluminum silicates, calcium aluminum silicates, zeolites and, preferably, alumina. In general, the content of the metals and/or their compounds in the supported catalysts is from 0.01 to 80% by weight, preferably from 0.1 to 50% by weight, especially from 0.5 to 30% by weight, based on the supported catalyst.

It is particularly advantageous to use, for the catalytic oxidation, a catalyst containing nickel and molybdenum, or cobalt, nickel and molybdenum or, preferably, cobalt and molybdenum, the metals in general being employed in the form of their compounds, preferably as oxides and/or sulfides. In general, the weight ratio of nickel to molybdenum or cobalt to molybdenum or nickel and cobalt to molybdenum (calculated as their oxides, nickel as NiO, cobalt as CoO and molybdenum as $MoO_3$) is from 1:50 to 50:1, preferably from 1:30 to 10:1, especially from 1:10 to 3:1. Preferably, these catalysts containing nickel and/or cobalt and molybdenum, or their compounds, are used as supported catalysts, alumina being the preferred carrier.

A further catalyst which is used with particular advantage for the catalytic oxidation contains a calcined mixed crystal compound $Fe_6Al_2(OH)_{16}CO_3$. This compound is in general calcined at from 150° to 600° C., preferably from 250° to 500° C., especially from 300° to 400° C. The calcined mixed crystal compound can be used as such but is advantageously used on a carrier, preferably alumina. Preferably, the iron content of the supported catalyst is from 1 to 50% by weight, preferably from 2 to 40% by weight, especially from 5 to 30% by weight.

It can be advantageous to carry out the catalytic oxidation with an arrangement such that during the desulfurization of gases containing less than about 5% by volume of $H_2S$ the catalyst is present in the jacket space, the $H_2S$-containing gas is passed through this space and the coolant, preferably water, is passed through the tubes of the reactor, while when desulfurizing gases containing from about 5% by volume of $H_2S$ upwards, the catalyst is present in the tubes of the reactor, the $H_2S$-containing gas is passed through the tubes and the coolant, preferably an organic heat transfer oil, is passed though the jacket space.

The tube reactor can consist of one tube surrounded by the jacket space, but in general comprises a plurality or large number of tubes, surrounded by the jacket space.

The process according to the invention is useful for the desulfurization of gases with $H_2S$ contents which can range from very low to very high values, for example from 0.5 to 100% by volume. The process is particularly economical at $H_2S$ contents from 1 to 50% by volume, preferably from 3 to 30% by volume. The $H_2S$-containing gases are obtained, for example, as acid gases from partial oxidation plants, coal gasification plants, natural gas scrubbers or refineries. The process may also be used for the direct desulfurization of $H_2S$-containing natural gas.

Examples of suitable oxygen-containing gases for the catalytic oxidation are oxygen itself, air enriched by addition of oxygen, or, preferably, air alone.

The sulfur formed in the tube reactor is isolated from the reaction mixture, obtained from the tube reactor, in a downstream condensation stage, advantageously by condensing it, for example in a heat exchanger, and removing the condensed sulfur in a separator, for example a cyclone separator.

In the direct catalytic oxidation sulfur yields of more than 90%, eg. 93%, are obtained, based on the $H_2S$ contained in the gas employed.

The reaction gas obtained after catalytic oxidation and separation of the sulfur formed can subsequently be subjected to a conventional catalytic Claus reaction, whereby the total $H_2S$ conversion to elementary sulfur can be increased to about 98%. In general, however, the $H_2S$ conversion to elementary sulfur achieved in the catalytic oxidation stage, for example from 92 to 95%, suffices and the $H_2S$ still present in the reaction gas resulting from the catalytic oxidation is removed by some other method.

A preferred process for removing the $H_2S$ still contained in the reaction gas is to add hydrogen to the gas obtained from the condensation stage downstream of the tube reactor and hydrogenate it catalytically at an elevated temperature over a catalyst containing nickel and/or cobalt and molybdenum, in order to convert residual sulfur compounds and elementary sulfur present in the gas to hydrogen sulfide, and scrub the hydrogen sulfide formed out of the hydrogenated gas stream by treatment with a solvent, isolate the hydrogen sulfide by regenerating the laden solvent and recycling it to the catalytic oxidation in the tube reactor. Preferably, the catalysts, containing molybdenum and nickel and/or preferably cobalt, which are used for the catalytic hydrogenation are of the type which, as described above, can also be used as catalysts for the novel direct catalytic oxidation of the $H_2S$-containing gases. In general, the hydrogenation is carried out at from 200° to 450° C., preferably from 250° to 400° C., especially from 280° to 370° C. The $H_2S$ is advantageously removed from the hydrogenated $H_2S$-containing gas by scrubbing with a selective solvent. The resulting acid gas containing the scrubbed-out $H_2S$ is advantageously recycled to the catalytic oxidation. Suitable selective solvents for the gas scrubbing are, for example, an aqueous solution of the potassium salt of N,N-dimethylaminoacetic acid (®ALKAZID liquor), dialkyl ethers of polyethylene glycols, for example, methyl isopropyl ether of polyethylene glycols (®SEPASOLV MPE), triethanolamine and methyldiethanolamine.

A further process for removing the hydrogen sulfide remaining in the reaction gas consists in that the gas obtained from the condensation stage downstream of the tube reactor is first catalytically hydrogenated, as described in the preceding paragraph, to convert residual sulfur compounds and elementary sulfur, present in the gas, to hydrogen sulfide. To remove the hydrogen sulfide contained in the hydrogenated gas, the latter is mixed with an oxygen-containing gas and ammonia and the mixture is then passed over active carbon, whereby the hydrogen sulfide is oxidized to elementary sulfur, which is absorbed by the carbon. Examples of suitable oxygen-containing gases are oxygen itself, air enriched by addition of oxygen and, preferably, air alone. Additionally to the oxygen-containing gas, the hydrogenated gas is mixed with ammonia, advantageously in gaseous form, generally in amounts of from 1 to 20,000 mg, preferably from 5 to 2,000 mg, especially from 10 to 1,000 mg, per $m^3$ (S.T.P.) of gas. The gas mixture thus obtained is in general passed over the active carbon at from 5° to 150° C., preferably from 20° to 120° C., especially from 30° to 80° C., advantageously at space velocities of from 10 to 10,000, preferably from 100 to 2,000, especially from 200 to 1,000, $m^3$ (S.T.P.) of gas mixture per $m^3$ of active carbon bed per hour. This results in selective oxidation of the hydrogen sulfide to elementary sulfur, the latter being absorbed on the active carbon.

Using this method it is possible to reduce the $H_2S$ content in the gas, obtained from the active carbon bed, to less than 1 $mg/m^3$ (S.T.P.).

The sulfur-laden active carbon bed is advantageously regenerated to isolate the sulfur. For example, this may be done by passing hot gases, e.g. carbon dioxide or nitrogen, over the sulfur-laden bed to remove the sulfur and then isolating the latter from the hot gas, for example by condensation. In general, the gases passed over the active carbon bed are at from 100° to 700° C., preferably from 150° to 600° C., especially from 200° to 550° C. An alternative method of regenerating the active carbon bed is to wash out the sulfur by extraction with polyammonium sulfide liquor.

An example of another process for removing the residual $H_2S$ from the reaction gas is to add air to the gas obtained from the condensation stage downstream of the tube reactor and catalytically oxidize the mixture at an elevated temperature over a catalyst containing vanadium oxide so as to convert the residual sulfur compounds and elementary sulfur present in the gas to sulfur dioxide, scrub the sulfur dioxide formed out of the resulting gas stream by treatment with a solvent, isolate the sulfur dioxide by regenerating the laden solvent, and recycle it to the catalytic oxidation in the tube reactor.

The Examples which follow illustrate the invention.

EXAMPLE 1

30 $m^3$ (S.T.P.) of a carbon dioxide containing 8.5% by volume of $H_2S$ were desulfurized in the plant shown in the FIGURE. The $H_2S$-containing carbon dioxide originated from a methyldiethanolamine wash in which acid gases were scrubbed out of the cracked gas of a synthesis gas plant operating by non-catalytic autothermal gasification of residual oils.

The $H_2S$-containing carbon dioxide (coming through line 1) was mixed with 6.22 $m^3$ (S.T.P.) of air (coming through line 2) and the mixture was heated to 180° C. in the heat exchanger 3 and passed to the reactor 5 via line 4. The reactor consisted of seven tubes having an internal diameter of 24 mm and a length of 2.8 m. The tubes contained 15 liters of a catalyst which had been obtained as described in Example 2. In the jacket space there was a mixture of 27% of diphenyl and 73% of diphenyl ether (®Diphyl from Bayer AG). The heat liberated by the reaction of $H_2S$ with the atmospheric oxygen caused evaporation of Diphyl, which passed via line 6 to the heat exchanger 7, where it was condensed, with simultaneous generation of steam; from there, the Diphyl was returned to the reactor 5 via line 8. Corresponding to the boiling point of Diphyl, the reactor exit assumed a temperature of 255° C. The reaction gases leaving the reactor 5 passed via line 9 to the heat exchanger 10, where the sulfur formed in the reaction was condensed, with simultaneous generation of steam; the sulfur was then separated out in the cyclone separator 11 and collected in the vessel 12. The liquid sulfur separated out was taken from the vessel 12 via line 13. The gas leaving the cyclone separator 11 had a residual sulfur content of 0.51% by volume, corresponding to a conversion of 93%. The sulfur compounds consisted of about one-third $SO_2$ and two-thirds $H_2S$, together with traces of $CS_2$ and COS. Corresponding to the vapor pressure of sulfur, the gas also contained, per $m^3$ (S.T.P.), about 2 g of sulfur which had not been separated out.

For further purification of this gas it was necessary to convert all sulfur compounds, together with the elementary sulfur still present in accordance with its vapor pressure, to $H_2S$. This was done by hydrogenation over a Co/Mo catalyst at from about 330° to 350° C. in the hydrogenation reactor 14, to which the gas was passed through line 15 after admixture of hydrogen coming through line 16. At the exit from the hydrogenation reactor 14, the gas contained only $H_2S$, except for a small amount of COS. The COS, which is thermodynamically stable under the conditions of the hydrogenation stage, was subsequently removed by hydrolysis in the hydrolysis reactor 18, if necessary after injection of water through line 17. After subsequent condensation of the steam, contained in the gas, in the heat exchanger 14, and removal of the water droplets in the cyclone separator 20, the gas entered a sieve tray column with 9 trays. Pure methyldiethanolamine liquor (40% strength) coming through line 22 from the degassing stage of the acid gas scrubber 23 of the synthesis gas plant, trickled in counter-current to the gas in the column. The $H_2S$-laden liquor was taken off at the bottom of the scrubber column and recycled by means of pump 24, through line 25, to the degassing stage of the acid gas scrubber 23. The unconverted $H_2S$ was thus returned to the inlet of the catalytic oxidation reactor. The scrubbed carbon dioxide, which had a residual $H_2S$ content of less than 10 mg/$m^3$ (S.T.P.), was discharged into the atmosphere. The small amounts of Diphyl which issued as vapor through line 27 were fed through line 26 to the jacket space of the tube reactor.

EXAMPLE 2

The catalyst used for the catalytic oxidation in Example 1 was prepared as follows:

43 liters of a solution containing 17.792 kg of $FeSO_4.7H_2O$ (64 moles) and 21.3 moles of aluminum nitrate in water, and a solution of 10.176 kg of technical-grade sodium carbonate in 48 liters of water, were run, in parallel, into a stirred kettle which already contained 8 liters of water. The precipitate obtained was filtered off and washed. The mixed crystal compound obtained showed the following alpha-lines in the X-ray diffraction diagram (Guinier photograph): alpha values [A]: 7.6; 2.62; 2.30; 1.95; 1.54.

The filter cake was dried and 7.85 kg of dry product were obtained. On subsequent calcination at 350° C., the dry mass showed a weight loss of 15.94% by weight, so that finally 6.6 kg of oxidic product were obtained. This product was intimately mixed with 79 kg of boehmite powder. 56 liters of water were added to the mixture in a kneader to give a paste, which was then extruded into 3 mm diameter extrudates. The latter were dried at 110° C. and then calcined at 400° C. After calcination, 84 kg of catalyst, having a bulk density of 0.613 kg/liter, were obtained.

EXAMPLE 3

30 $m^3$ (S.T.P.)/h of a mixture of 27.45 $m^3$ (S.T.P.) of natural gas having the following composition:

| | |
|---|---|
| $CO_2$ | 1.6% by volume |
| $N_2$ | 4.17% by volume |
| $CH_4$ | 88.13% by volume |
| $C_2H_6$ | 4.13% by volume |
| $C_3H_8$ | 1.4% by volume |
| $C_4H_{10}$ | 0.37% by volume |
| $C_5+$ hydrocarbons | 0.20% by volume | and 2.55 $m^3$ (S.T.P.)/h of $H_2S$ (=8.5% by volume of $H_2S$, based on the mixture) were mixed with 6.22 $m^3$ (S.T.P.) of air and desulfurized in a tube reactor, as described in Example 1, paragraph 2. The sulfur formed was separated off, and the reaction gas taken off at the top of the cyclone separator was then additionally passed through a conventional catalytic Claus stage. For this purpose, the gas was heated to 180° C. and passed through a reactor filled with 30 liters of Claus catalyst, for example synthetic alumina (catalyst R 10-11 from BASF). Whilst the $H_2S$ conversion in the catalytic oxidation in the tube reactor was 93%, it rose to 98% as a result of the additional Claus stage. The further sulfur formed was condensed out of the reaction gas from the Claus stage, and separated off.

The gas obtained after separating off the sulfur was then catalytically hydrogenated as described in Example 1, resulting in the hydrogenation to $H_2S$ of both the sulfur compounds present in the gas and the elementary sulfur present, in proportion to its vapor pressure, in the gas.

For final purification, water contained in the hydrogenated gas was condensed out and the gas was then mixed with about 150 liters/h of air and 8.6 liters/h of $NH_3$ and passed, at 50° C., through an active carbon bed at a space velocity of 500 m$^3$ (S.T.P.)/m$^3$h. This oxidized the residual $H_2S$ in the gas to sulfur, which was absorbed on the active carbon. The $H_2S$ content of the gas issuing from the active carbon bed was 1 mg/m$^3$ (S.T.P.).

We claim:

1. A process for the desulfurization of an $H_2S$-containing gas by direct catalytic oxidation of the $H_2S$ to elementary sulfur which comprises:
    (a) passing a mixture of the $H_2S$-containing gas and an oxygen-containing gas through the tubes of a tube reactor and
    (b) contacting said mixture with a catalyst containing one or more metals selected from the group of iron, cobalt, nickel, molybdenum or their sulfides or oxides said catalyst being present in the tubes of the tube reactor and filling the tubes over the entire cross-section of the tubes;
    (c) indirectly removing the heat of reaction by means of water or an organic heat transfer oil as a coolant, said coolant being present in the jacket space around the tubes of the tube-reactor;
    (d) taking the gaseous reaction mixture containing the sulfur formed from the tube-reactor keeping the exit temperature of the gaseous reaction mixture at 220° to 320° C.;
    (e) passing the gaseous reaction mixture through a condensation stage downstream of the tube reactor and
    (f) separating out the sulfur of the reaction mixture in said condensation stage.

2. The process of claim 1, wherein the heat of reaction is removed by evaporative cooling using an organic heat transfer oil as the coolant.

3. The process of claim 2, wherein the organic heat transfer oil is a mixture of diphenyl and diphenyl ether.

4. The process of claim 1, wherein the catalytic oxidation is carried out with a catalyst containing the calcined mixed crystal compound $Fe_6Al_2(OH)_{16}CO_3$.

5. The process of claim 1, wherein the catalytic oxidation is carried out with a catalyst containing cobalt and molybdenum or their sulfides or oxides.

6. The process of claim 1 wherein a supported catalyst, with alumina as the carrier and containing from 1 to 50% by weight, based on the supported catalyst, of iron is used.

7. A process as claimed in claim 1, wherein the gas obtained from the condensation stage downstream of the tube reactor is mixed with hydrogen and hydrogenated catalytically at an elevated temperature over a catalyst containing nickel and cobalt and molybdenum or nickel and molybdenum or cobalt and molybdenum, in order to convert residual sulfur compounds and elementary sulfur present in the gas to hydrogen sulfide, the hydrogen sulfide formed is scrubbed out of the hydrogenated gas stream by treatment with a solvent, and the hydrogen sulfide is isolated by regenerating the laden solvent and is recycled to the catalytic oxidation in the tube reactor.

8. A process as claimed in claim 1, wherein the gas obtained from the condensation stage downstream of the tube reactor is mixed with hydrogen and hydrogenated catalytically at an elevated temperature over a catalyst containing nickel and cobalt and molybdenum or nickel and molybdenum or cobalt and molybdenum to convert residual sulfur compounds and elementary sulfur present in the gas to hydrogen sulfide, and, to remove the hydrogen sulfide, the gas resulting from the hydrogenation is mixed with an oxygen-containing gas and ammonia and the mixture is then passed over active carbon to oxidize the hydrogen sulfide to elementary sulfur, which is absorbed on the active carbon.

9. The process of claim 1, wherein the gas obtained from the condensation stage downstream of the tube reactor is mixed with air and catalytically oxidized at an elevated temperature over a catalyst containing vanadium oxide so as to convert the residual sulfur compounds and elementary sulfur present in the gas to sulfur dioxide, and the sulfur dioxide formed is scrubbed out of the resulting gas stream by treatment with a solvent, isolated by regenerating the laden solvent, and recycled to the catalytic oxidation in the tube reactor.

* * * * *